June 3, 1969  C. N. HUGHES  3,447,596
AUTOMOBILE AIR-CONDITIONING SYSTEM
Filed July 10, 1967

INVENTOR,
Carl N. Hughes
BY
Weatherford & Weatherford
Attys

United States Patent Office 3,447,596
Patented June 3, 1969

3,447,596
AUTOMOBILE AIR-CONDITIONING SYSTEM
Carl N. Hughes, 1216 Forrest Ave.,
Memphis, Tenn. 38104
Filed July 10, 1967, Ser. No. 652,047
Int. Cl. B60h 3/00; B61d 27/00
U.S. Cl. 165—42                         1 Claim

ABSTRACT OF THE DISCLOSURE

An automobile air-conditioning system in which the heat exchanging coil is disposed in transversely arranged co-planar alinement with the radiator core of the engine cooling system forwardly of the engine-driven fan of the automobile so that external air is drawn into the system and passes over the radiator core and the air conditioning coil simultaneously and independently of each element to effect simultaneous and independent cooling of the engine coolant and heat exchange of the air-conditioning coolant.

BACKGROUND OF THE INVENTION

Field of the invention

The present invention pertains to heat exchanging means in automobile air-conditioning systems, and more particuldly to refrigerant gas cooling means utilizing the engine radiator fan and the air circulated thereby.

The present invention provides a plurality of tubes connected at their respective upper and lower ends to provide an uninterrupted tortuous path for the passage of the refrigerant gas therethrough, the tubes being in substantial coplanar side by side alinement with the radiator of the automobile, placed adjacent thereto so that the air drawn by the engine fan passes over the tubes and the automobile radiator simultaneously, delivering cooling external air to the radiator to prevent the engine from overheating and delivering cooling external air to pass unimpededly over the air-conditioner heat dissipating tubes to provide to the air conditioner its maximum cooling.

DESCRIPTION OF THE PRIOR ART

There have been numerous prior automobile air-conditioning systems using heat exchanging means for cooling and re-cooling the refrigerant gases but these prior devices have been positioned before or behind the automobile radiator.

In prior devices utilizing the placement of the air-conditioner exchanger forwardly of the automobile radiator, the incoming air passage over the air-conditioning exchanger removes the heat therefrom and passes the warmer air over the radiator, thus preventing the radiator from cooling the engine coolant properly, allowing the automobile engine to overheat.

In prior devices utilizing the placement of the air-conditioner heat exchanger rearwardly of the automobile radiator, the moving air passes over the radiator first absorbing heat therefrom and thence rearwardly to the air-conditioner heat exchanger. The moving air heated by the radiator is unable efficiently to cool the heat exchanger and the automobile air conditioner is restricted to less than maximum cooling capacity.

The prior art is known to include the following references: 2,761,293, J. M. Eubank, Sept. 4, 1956; 3,059,449, H. L. Dilliner, Oct. 23, 1962; 3,087,312, C. W. White, Apr. 30, 1963; 3,153,441, E. B. Pippert et al., Oct. 20, 1964; 3,181,308, O. F. Vander Hagen, May 4, 1965; 3,218,821, M. E. Spatt, Nov. 23, 1965.

The field of the prior art: Class 62, Sub-classes 239 and 244. Class 165, Sub-classes 41, 42 and 172.

SUMMARY OF THE INVENTION

The present invention provides new and novel means for removing excess heat from the refrigerant gas utilized in the air-conditioning system of an automobile or similar vehicle. The present invention further provides a series of tubular means in substantially co-planar side by side alinement with the engine coolant radiator means of an automobile for the dissipation of heat from the tubular means, transmitted to the tubular means from the refrigerant gas flowing therethrough. The present invention additionally provides means for utilizing an unimpeded passage of atmospheric air through and around the tubular means for more efficient dissipation of the heat of the refrigerant gas carried thereby.

OBJECTS OF THE INVENTION

The principal object of the present invention is to provide heat dissipating means for the air-conditioning system of an automobile.

Another object of the present invention is to provide a substantially uniplanar-tubular heat dissipating means for an automobile air-conditioning system.

A further object of the present invention is to provide tubular heat dissipating means for an automobile air-conditioning system having the tubular means in coplanar alinement with the engine coolant means of the automobile.

Another object of the present invention is to provide an automobile air-conditioning system with heat dissipating means utilizing an unrestricted flow of air provided by the automobile engine fan means; and A further object of the present invention is to generally improve the design, construction and efficiency of automobile air conditioners.

DESCRIPTION OF THE DRAWINGS

The means by which the foregoing and other objects of the present invention are accomplished and the manner of their accomplishment will be readily understood from the following specification upon reference to the accompanying drawings, in which.

DESCRIPTION OF THE PREFERRED EMBODIMENT

Figure 1:
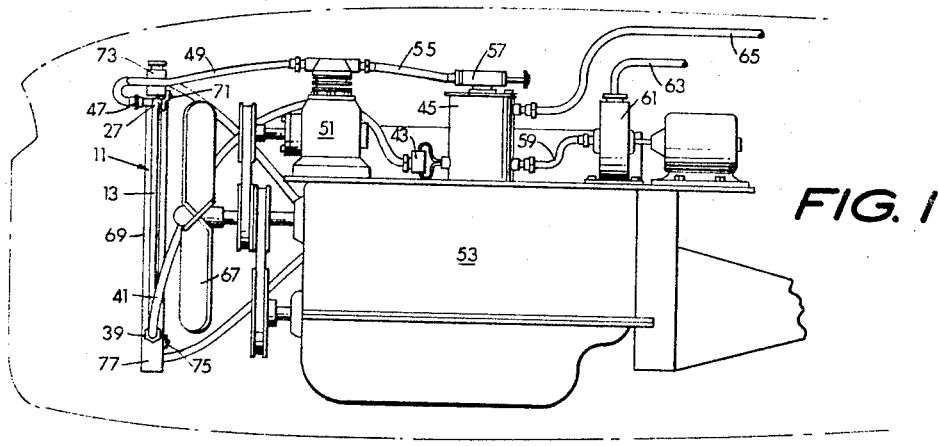
FIG. 1 is a side elevational view of an automobile engine incorporating the device of the present invention.

Referring now to the accompanying drawings in which the various parts are indicated by numerals, the present invention comprises a substantially sinuous hollow coil 11 provided with a series of substantially parallel, vertically disposed elongated hollow tubes 13, 15, 17, 19, 21, 23, 25. The sinuous coil 11 is additionally provided with substantially arcuate pipe means 27 attached at one of its ends to the uppermost end of the tube 13 and at its other end to the uppermost end of the tube 15, a similar arcuate pipe 29 communicatingly connecting the upper ends of the tubes 17, 19, and a similar arcuate pipe 31 communicatingly connecting the upper ends of the tubes 21, 23.

The sinuous coil 11 is further provided with an arcuate hollow pipe 33 spanning between and connecting the lowermost portions of the vertical tubes 15, 17, a similar arcuate hollow pipe 35 connecting the lowermost portions of the vertical tubes 19, 21, and a hollow arcuate pipe 37 attached to and communicating between the lowermost ends of the vertical tubes 23, 25.

The lower terminus of the tube 13 is provided with coupling means 39 for the attachment thereto of a substantially flexible hose means 41 extending rearwardly away from the sinuous coil 11 into disengageable attachment with valve means 43 rigidly communicatingly connected to the refrigerant gas reservoir 45. The upper terminal end of the vertical tube 25 is provided with coupling means 47 and flexible hose means 49 attached thereto extending substantially rearwardly therefrom into disengageable attachment with a compressor 51. The compressor 51, rigidly affixed to the automobile engine 53, is provided with a substantially flexible hose means 55 detachably connected thereto and extending therefrom to a regulator means 57 mounted upon, and in communication with, the refrigerant reservoir 45. The reservoir 45 is provided with substantially flexible intake hose means 59 extending therefrom into coupling engagement with a fan 61. The fan 61 is provided with hose-like intake means 63 attached thereto and in communication with cool air circulating means (not shown) within the passenger compartment of an automobile. Flexible hose means 65 are provided for carrying the warmed refrigerant from the circulator (not shown) forwardly therethrough into the refrigerant reservoir 45. The warmed refrigerant in the reservoir 45 is returned from the reservoir 45 though the valve means 43 and the flexible hose 41 to the lower terminal of the tube 13 and thence sinuously through the coil 11 where the refrigerant is further cooled by the passage of air across the sinuous coil 11, urged thereacross by the engine fan 67. The air cooled refrigerant in the tube 25 of the sinuous coil 11 passes therefrom through the flexible hose means 49 into the compressor 51 for further cooling, as by compression, and is transmitted from the compressor through the hose 55 to the reservoir 45. The cooled refrigerant is removed from the reservoir through the hose 59 by the fan means 61 and discharged therefrom into the circulator through the hose 63.

Figure 2:
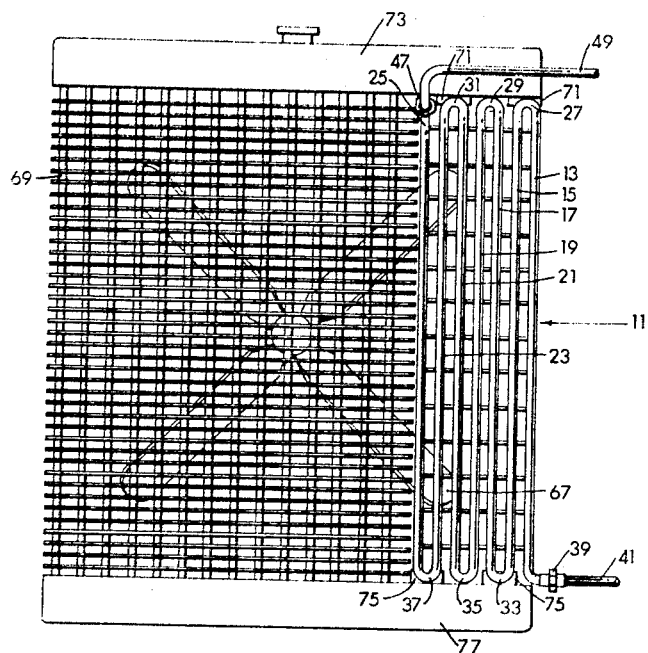
FIG. 2 is an enlarged front elevational view of the device of FIG. 1.

It will be further observed upon reference to FIG. 2 of the drawings that the sinuous coil 11 is maintained in substantial coplanar adjacency with the radiator core 69 by the attachment clips 71 rigidly affixed to the upper radiator tank 73, and the arcuate pipes 27, 31 and the attachment clips 75 affixed to the lower radiator tank 77 and the respective arcuate pipes 33, 37. The arrangement of the sinuous coil 11 in coplanar alinement with the radiator core 69 provides a substantially unimpeded and uninterrupted flow of air thereacross induced by the rotation of the engine fan 66 and the blades thereof.

It will be seen that the sinuous coil 11 and radiator core 69 are arranged in side by side relationship within the normal transverse space occupied by a conventional automobile radiator; that the radiator core 69 occupies the majority of the transverse space of the assembly and extends transversely across the longitudinal midline of the normal disposition of the radiator relative to the engine driven fan. The coil 11 occupies a minority of the transverse space and is disposed in the range of fan 67 so that impinging external air is drawn by the fan over the radiator core and the refrigerant coil simultaneously with the cooling effect of the impinging air upon each of the core and coil being independent so that the heat exchange effect upon the radiator is independent of the heat exchanging effect upon the refrigerant coil 11.

These elements are disposed in side by side relationship substantially coplanar and the refrigerant coil 11, as stated, occupies a lesser portion of the transverse space than does the engine coolant core 69. In this manner the air-conditioning refrigerant coil is mounted so as to receive unimpeded flow of cooling air without the adverse effect of prior warming through passage beyond the radiator core, and simultaneously the radiator core is enabled to receive direct cooling air flow without the prior effect of passage thereof over an air-conditioning coil unit. The combined unit is thus enabled more efficiently simultaneously to effect heat exchange and cooling of the engine coolant through the medium of the cooling of the radiator core and of the air-conditioning coolant through the medium of the cooling of coil 11.

I claim:

1. In an automobile which includes a longitudinally disposed engine incorporating a cooling water jacket retaining liquid coolant, an engine driven fan disposed forwardly of said engine and drivingly coupled thereto for drawing external air to the engine, and an air-conditioning system for the interior of said automobile, said air-conditioning system having a refrigerant circulating means including a compressor, refrigerant reservoir and fan, heat dissipating means for said engine water jacket and for said refrigerant circulating means, which comprises, a singular planar heat exchanger partially communicating directly with said water jacket and extending transversely relative to said engine and forwardly of said fan, the part of said heat exchanger communicating with said water jacket comprising a radiator core being abbreviated at one side of the center line of said fan so that the major portion of said radiator core is disposed forwardly beyond the other side of said fan center line and the abbreviated portion of said radiator core overlaps and it extends oppositely beyond the other side of the center line of said fan, said radiator core being transversely elongated and occupying a substantially major portion of the space disposed directly forward of the engine driven fan and being open to receive impinging air drawn therethrough and accelerated by the operation of said fan, said heat exchanger having upper and lower radiator tanks disposed for supporting the radiator core and passing the liquid coolant into and through said radiator core, a sinuous coil forming the remaining and minor portion of said heat exchanger, and being coupled to and communicating with said refrigerant circulating means including the compressor, refrigerant reservoir and fan, said coil comprising a series of vertically disposed tubes interconnecting to form said coil, said tubes being arranged and supported in parallelism and co-planar with said radiator core, attachment clips connecting said coil with the upper and lower radiator tanks of said heat exchanger to provide structural support for said sinuous coil, said coil being offset to one side of said fan center line thereby comprising a minor portion of said heat exchanger, and being forwardly open to receive the impinging air drawn by said fan independently of the air drawn through said radiator core, said coil occupying a minor portion of the forwardly open air-receiving space of said automobile relative to the major portion occupied by said radiator core, whereby said radiator core and said sinuous coil independently and directly receive impinging air from the movement of said automobile and from the action of said fan to afford maximum air cooling effect to each of the heat exchanging elements, minimizing loss of cooling air effect upon either of said heat exchanging elements.

References Cited

UNITED STATES PATENTS 3,315,731  4/1967  Jensen et al. _____ 165—140

ROBERT A. O'LEARY, *Primary Examiner.*

C. SUKALO, *Assistant Examiner.*

U.S. Cl. X.R.

165—122, 140